United States Patent
Hirshberg (10) Patent No.: US 9,699,243 B2
(45) Date of Patent: Jul. 4, 2017

(54) USER INTERFACE DELEGATION TO A DELEGATED DEVICE

(71) Applicant: Empire Technology Development LLC, Wilmington, DE (US)

(72) Inventor: David Hirshberg, Haifa (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 501 days.

(21) Appl. No.: 14/342,377

(22) PCT Filed: Jun. 24, 2013

(86) PCT No.: PCT/US2013/047260
§ 371 (c)(1),
(2) Date: Mar. 1, 2014

(87) PCT Pub. No.: WO2014/209255
PCT Pub. Date: Dec. 31, 2014

(65) Prior Publication Data
US 2015/0237111 A1    Aug. 20, 2015

(51) Int. Cl.
*H04L 15/16* (2006.01)
*H04L 29/08* (2006.01)
(Continued)

(52) U.S. Cl.
CPC .......... *H04L 67/06* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS

| 7,487,454 B2 | 2/2009 | Czerwinski et al. |
| 8,447,820 B1 | 5/2013 | Gay |

(Continued)

FOREIGN PATENT DOCUMENTS

GB    2405566 A    3/2005

OTHER PUBLICATIONS

McKnight LW, Howison J, Bradner S. Guest Editors' Introduction: Wireless Grids—Distributed Resource Sharing by Mobile, Nomadic, and Fixed Devices. IEEE Internet computing. Jul. 2004;8(4):24-31.*

(Continued)

*Primary Examiner* — Ranodhi Serrao
*Assistant Examiner* — James Fiorillo
(74) *Attorney, Agent, or Firm* — Turk IP Law, LLC (57) ABSTRACT

The present technology provides an illustrative method for delegating user interface-related tasks. In some examples, the method includes receiving a request to delegate a user interface-related task to a delegated computing device, and causing the transceiver of the delegating device to send a delegation command to the delegated computing device to establish a delegation session on the delegated computing device. The delegation command requests establishment of a delegated user interface to facilitate performance of the user interface-related task on the delegated computing device, and the delegated user interface is substantially similar to the user interface of the delegating device. The method also includes exchanging data associated with the user interface-related task with the delegated computing device.

18 Claims, 5 Drawing Sheets

(51) Int. Cl.
| | |
|---|---|
| G06F 3/0484 | (2013.01) |
| H04L 29/06 | (2006.01) |
| G06F 21/62 | (2013.01) |
| H04L 12/917 | (2013.01) |
| H04B 7/06 | (2006.01) |
| G06Q 10/10 | (2012.01) |

(52) U.S. Cl.
CPC ....... *G06F 21/6218* (2013.01); *G06Q 10/107* (2013.01); *H04B 7/0689* (2013.01); *H04L 47/76* (2013.01); *H04L 65/105* (2013.01)

(56) References Cited

U.S. PATENT DOCUMENTS

| | | | | |
|---|---|---|---|---|
| 8,495,244 | B2 * | 7/2013 | Bonar | H04B 7/0689 709/239 |
| 9,130,899 | B1 | 9/2015 | Baird et al. | |
| 2004/0113948 | A1 | 6/2004 | Shahrbabaki et al. | |
| 2008/0272889 | A1 | 11/2008 | Symons | |
| 2008/0281944 | A1 * | 11/2008 | Vorne | H04L 29/08846 709/218 |
| 2008/0320560 | A1 | 12/2008 | Casey et al. | |
| 2009/0006548 | A1 * | 1/2009 | Ramanathan | G06Q 10/107 709/204 |
| 2009/0187971 | A1 * | 7/2009 | Bao | H04L 65/105 726/3 |
| 2010/0002122 | A1 | 1/2010 | Larson et al. | |
| 2010/0060547 | A1 | 3/2010 | Bloebaum et al. | |
| 2011/0029671 | A1 | 2/2011 | Deprun et al. | |
| 2011/0113353 | A1 | 5/2011 | Koh et al. | |
| 2011/0115737 | A1 | 5/2011 | Fuyuno et al. | |
| 2012/0081313 | A1 | 4/2012 | Sirpal et al. | |
| 2013/0132885 | A1 | 5/2013 | Maynard et al. | |
| 2013/0214995 | A1 | 8/2013 | Lewin et al. | |
| 2014/0089508 | A1 * | 3/2014 | Hawver | H04L 47/76 709/226 |
| 2014/0108486 | A1 * | 4/2014 | Borzycki | G06F 21/6218 709/201 |
| 2014/0129920 | A1 | 5/2014 | Sheretov et al. | |
| 2014/0280962 | A1 * | 9/2014 | Schultz | H04L 67/1074 709/226 |
| 2016/0065650 | A1 * | 3/2016 | Pahwa | H04L 67/06 709/219 |
| 2016/0105528 | A1 * | 4/2016 | Holmes | G06F 17/30864 709/217 |

OTHER PUBLICATIONS

"Cross compiling node.js for arm," accessed at http://web.archive.org/web/20130129095036/http://fastr.github.com/articles/cross-compiling-node.js-for-arm.html, Aug. 17, 2010, pp. 1-2.

"Master/slave (technology)," Wikipedia, accessed at en.wikipedia.org/wiki/Master-slave_(technology), last modified on Aug. 10, 2012, pp. 1-2.

"MightyText lets you view and respond to texts from any computer," accessed at http://androidandme.com/2012/06/applications/mightytext-lets-you-view-and-respond-to-texts-from-any-computer/, Jun. 19, 2012, pp. 1-10.

"MouseXP Bluetooth presentation remote control for smartphone," accessed at http://web.archive.org/web/20130720023737/http://www.free-power-point-templates.com/articles/wmousexp-bluetooth-presentation-remote-control-for-smartphone/, accessed on Feb. 25, 2014, pp. 1-6.

"Node Streams: How do they work?," accessed at http://web.archive.org/web/20130517205910/http://maxogden.com/node-streams, accessed on Feb. 25, 2014, pp. 1-4.

"The Top Free Ways to Stream Video From Your Computer to Your Mobile or Tablet," accessed at makeuseof.com/tag/the-top-free-ways-to-stream-video-from-your-computer-to-your-mobile-or-tablet/, Jun. 4, 2012, pp. 1- 12.

"Windows SideShow," Wikipedia, accessed at http://web.archive.org/web/20120429182552/http://en.wikipedia.org/wiki/Windows_SideShow, last modified on Apr. 1, 2012, pp. 1-4.

Bandelloni, R., and Paternò, F., "Flexible Interface Migration," in Proceedings of the 9th International Conference on Intelligent User Interfaces, pp. 148-155, ACM (2004).

Berti, S., et al., "A Taxonomy for Migratory User Interfaces," Interactive Systems, Design, Specification, and Verification, vol. 3941, pp. 149-160 (2006).

Block, F., et al., "VoodooSketch—Extending Interactive Surfaces with Adaptable Interface Palettes," Proceedings of the Second International Conference on Tangible and Embedded Interaction, pp. 55-58 (2008).

Hutchings, D.R., and Stasko, J., "Shrinking Window Operations for Expanding Display Space," In Proceedings of the Working Conference on Advanced Visual Interfaces, pp. 350-353, ACM (2004).

James, C., "MS Sideshow Device Free," accessed at https://play.google.com/store/apps/details?id=com.iml.sideshow_free, Nov. 29, 2012, pp. 1-3.

Johanson, B., et al., "PointRight: Experience with Flexible Input Redirection in Interactive Workspaces," In Proceedings of the 15th Annual ACM Symposium on User Interface Software and Technology, pp. 227-234, ACM (2002).

Lockhorn, J., and Schweickhardt, H., "Ubiquitous Computing—Keeping Up With the Digital Consumer," Razorfish5, accessed at http://web.archive.org/web/20130606005106/http://www.razorfish5.com/articles/ubicomp.aspx#01, accessed on Feb. 25, 2014, pp. 1-4.

McElheam, K., "How to create custom toolbars for Microsoft Word 2011," accessed at http://web.archive.org/web/20130606033003/http://www.macworld.com/article/1158396/wordtoolbars.html, Mar. 24, 2011, pp. 1-11.

Spindler, M., et al., "Towards making graphical user interface palettes tangible," ACM International Conference on Interactive Tabletops and Surfaces, pp. 291-292 (2010).

Tan, D.S., "WinCuts: Manipulating Arbitrary Window Regions for More Effective Use of Screen Space," CHI '04 Extended Abstracts on Human Factors in Computing Systems, pp. 4, (2004).

Uhler, S.A., "MTX-A Shell That Permits Dynamic Rearrangement of Process Connections and Windows," In Proceedings of the Winter 1990 USENIX Conference, pp. 1-10 (1990).

"Chromecast:How to set it up on your tv (walkthrough)," Youtube, accessed at http://www.youtube.com/watch?v=-H6RWzkWVD8, accessed on Feb. 26, 2014, pp. 1-3.

Brownlee, M., "Google Chromecast Review!," Youtube, accessed at http://www.youtube.com/watch?v=TK4u6wm-HIk, accessed on Feb. 26, 2014, pp. 1-2.

"Samsung SideSync—Phone Screen Share," Youtube, accessed at http://www.youtube.com/watch?v=JH-ddYqxDac, accessed on Feb. 26, 2014, p. 1-1.

International Search Report with Written Opinion for International Application No. PCT/US2013/047260 mailed on Jan. 22, 2014.

International Search Report with Written Opinion for International Application No. PCT/US2013/065151 mailed on Jan. 29, 2014.

Ghafoor, O., "Group cast, How to share your screen using Galaxy S3 and Note Tab 10.1," accessed at http://www.youtube.com/watch?v=Ih4QLoW9ivw, published on Nov. 14, 2012, pp. 3.

Ghafoor, O., "Samsung Galaxy S4 IV: Group Play!," accessed at https://www.youtube.com/watch?v=IxAljg5dfSw, published on May 6, 2013, pp. 2.

WPXBOX. Bluetooth File Transfer for Windows Phone 8. Dec. 14, 2012 (Dec. 14, 2012) [retrieved on Jan. 6, 2014]. Retrieved from the internet: <URL:http://www.youtube.com/watch?v=3LPzPiVAROo >. entire document.

* cited by examiner

USER INTERFACE DELEGATION TO A DELEGATED DEVICE

CROSS-REFERENCE TO RELATED APPLICATION

This Application is the U.S. National Stage filing under 35 U.S.C §371 of PCT Application Ser. No. PCT/US2013/047260 filed on Jun. 24, 2013. The PCT Application is herein incorporated by reference in its entirety.

BACKGROUND

The following description is provided to assist the understanding of the reader. None of the information provided or references cited is admitted to be prior art.

Today, users consume and create content using multiple devices. For example, users may read emails, watch videos, and edit documents on mobile phones, tablets, laptops, and desktop computers. The form factors of the devices, however, make some devices more suitable than others for carrying out certain tasks. For example, a user may read a document on a mobile device but prefer to edit the document on a larger screen.

Existing methods for transitioning from a first device to a second device may be complex. For example, a user may be required to make a document available on the second device. In one example, if a user wishes to access an email on a second device, the user may be required to log into the email account associated with the email on the second device before accessing the email on the second device.

SUMMARY

According to some examples, the present technology provides an illustrative delegating device. The delegating device includes a user interface configured to receive an input and a transceiver configured to send and receive data. The delegating device further includes a memory configured to store computer-executable instructions and a processor configured to execute the computer-executable instructions to perform various operations. Such operations include receiving a request to delegate a user interface related task to a delegated computing device, and causing the transceiver to send a delegation command to the delegated computing device to establish a delegation session on the delegated computing device. The delegation command requests establishment of a delegated user interface to facilitate performance of the user interface related task on the delegated computing device, and the delegated user interface is substantially similar to the user interface of the delegating device. The operations further include exchanging data associated with the user interface-related task with the delegated computing device.

According to some examples, the present technology also provides an illustrative delegated device. The delegated device includes a user interface configured to receive a user input and a transceiver configured to send and receive data. The delegated device also includes a memory configured to store computer-executable instructions and a processor configured to execute the computer-executable instructions. Execution of the computer-executable instructions causes the delegated device to perform operations including receiving a delegation command from a delegating computing device to establish a delegation session, wherein the delegation command requests establishment of a user interface related task on the delegated device, and wherein the user interface related task was initiated at the delegating computing device. Execution of the computer-executable instructions also causes the delegated device to exchange data associated with the user interface-related task with the delegated computing device.

According to some examples, the present technology provides an illustrative method for delegating user interface related tasks. The method includes receiving a request to delegate a user interface related task to a delegated computing device. The method also includes causing the transceiver of the delegating device to send a delegation command to the delegated computing device to establish a delegation session on the delegated computing device. The delegation command requests establishment of a delegated user interface to facilitate performance of the user interface related task on the delegated computing device, and the delegated user interface is substantially similar to the user interface of the delegating device. The method further includes exchanging data associated with the user interface-related task with the delegated computing device.

According to some examples, the present technology further provides another illustrative method for delegating user interface related tasks. The method includes receiving, at a delegated computing device, a delegation command from a delegating computing device to establish a delegation session. The delegation command requests establishment of a user interface related task on the delegated computing device, and the user interface related task was initiated at the delegating computing device. The method further includes exchanging, by the delegated computing device, data associated with the user interface-related task with the delegated computing device, and automatically updating, by the delegated computing device, the delegating computing device with actions performed at the delegated computing device corresponding to the user interface related task.

The preceding summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Described herein are technologies, including illustrative systems and methods for implementing a delegation of a user interface-related task from an initiating device ("the delegating device") to another device ("the delegated device"). In one embodiment, user interface-related tasks include tasks that require user attendance or attention to be performed successfully. Examples of such user attendance or attention may include viewing a display, viewing a web page, listening to streamed audio. Additional examples of user attendance or attention include manipulation of a user interface which by way of example may include scrolling a screen, pausing or playing an audio or video stream, editing a file, selecting objects from a menu, selecting buttons on an interface, speaking to a device, or any other suitable user interface manipulation actions. In one embodiment, delegation of the user interface-related task involves delegation of a user interface from the delegating device to the delegated device. In another embodiment, a delegated device may use a pre-existing user interface to enable performance of the user interface-related task.

In a further embodiment, a user interface-related task may be delegated to the delegated device such that no further actions are required by the delegating device for performance of the user interface-related task. An example of such a user interface-related task may include transferring the display/viewing of a video stream from the delegating device to the delegated device. In still a further embodiment, a delegated device may manage a user interface associated with the user interface-related task and after completion of the user interface-related task may send appropriate documents and/or instructions back to the delegating device. For example, the user interface-related task may involve editing a file, and the delegated device may control such editing. After completion of the editing, the delegated device may transfer the edited file back to the delegating device.

In still another embodiment, delegation of the user interface-related task may involve delegation of at least a portion of a user interface associated with the user interface-related task such that a portion of the user interface-related task is performed on the delegated device while another portion of the user interface-related task continues to be performed by the delegating device. For example, a smartphone (i.e., the delegating device) may delegate text entry to a personal computer (i.e., the delegated device) having a full keyboard while retaining the display functions and/or the actual file modification functions on the smartphone. According to such an embodiment, the text entry selections from the personal computer may be transferred to the smartphone, which processes the text entry selections and displays the modifications to the file to the user.

The delegating and delegated devices may communicate with each other using existing communication technologies including, but not limited to, Bluetooth, Infrared Data Association ("RDA"), Near Field Communication ("NFC"), Local Area Networks ("LAN"), Wi-Fi, Wide Area Networks ("WAN"), etc. Additionally, the delegating and delegated devices may communicate using a web-based delegation connection server. User interfaces and/or user interface-related tasks may be sent over established delegation sessions between the delegating device and the delegated device. Delegation of a user interface-related task may include delegation of a specific task (e.g., rendering of a video, editing a document, editing or presenting data objects, editing email, opening a new file or webpage, etc.). In addition, delegation of the user interface-relate task may include communication to the delegated device of data objects, a customized toolbar or interface for a user interface-related task, and configuration settings for a user interface-related task.

Delegating a user interface-related task allows a user to initiate the user interface-related task on the delegating device and continue execution of the user interface-related task on the delegated device. In one embodiment, delegation of a user interface-related task may include delegation of a user interface associated with the user interface-related task. For example, a user may initially access an email on a smart phone, delegate the email user interface to a tablet, and continue reading or responding to the email on the tablet. In another example, a streaming video may initially be accessed using a desktop computer. A video playback user interface and a task of rendering the video may be delegated to a tablet, such that the user may continue to view the video on the tablet. In another example, the user may delegate only a user interface associated with controls for the video playback (i.e., a video playback control user interface) to the tablet. In this way, the user may control playback via the video playback control user interface on the table while continuing to watch the video on the desktop computer. In yet another example, a user may receive a text message on a smart phone. The user may delegate a user interface-related task associated with responding to the text message to a laptop, such that the user may respond to the text message using the keyboard of the laptop. This delegation may include the delegation of a user interface usable for responding to the text message.

Figure 1:
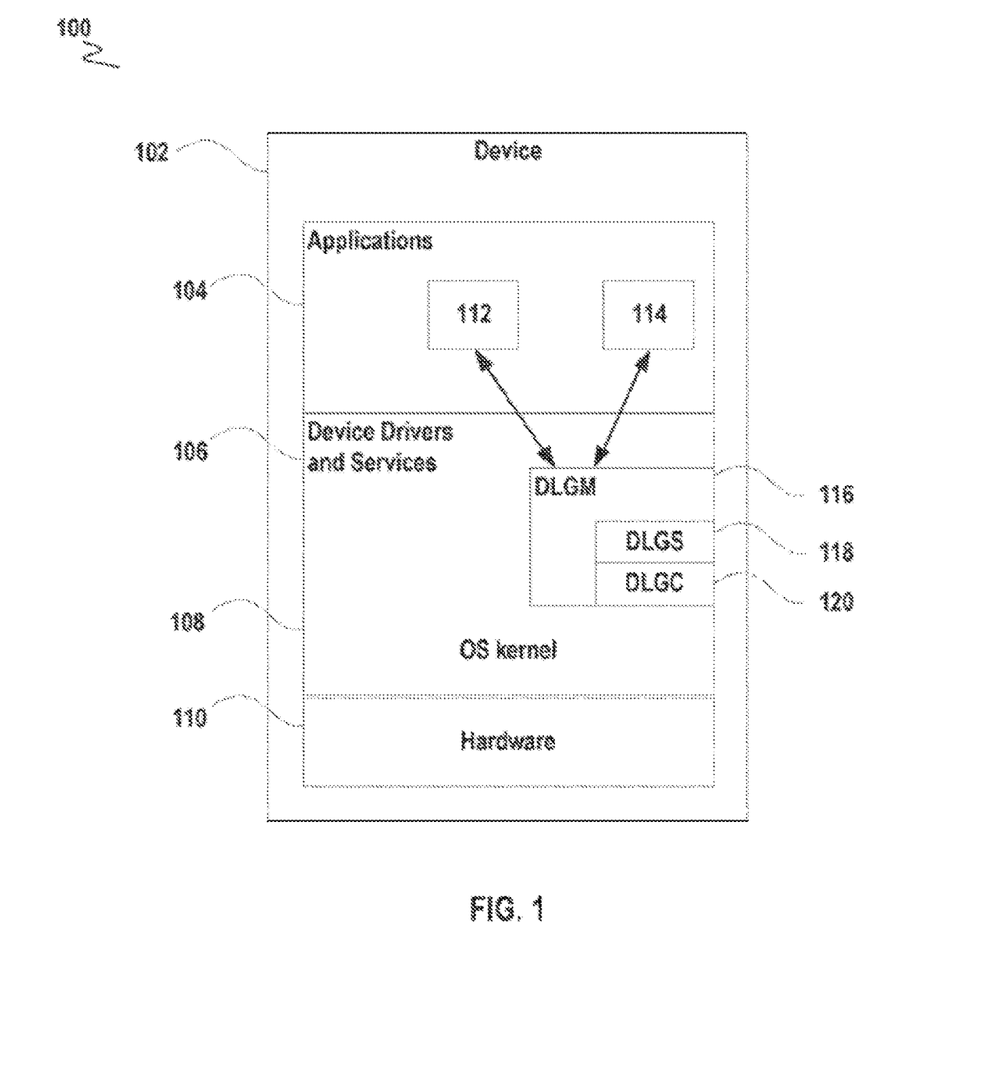
FIG. 1 depicts a device having a delegating manager in accordance with an illustrative embodiment.

FIG. 1 depicts a device having a delegating manager in accordance with an illustrative embodiment. As depicted in FIG. 1, a device 102 includes a software stack having an application layer 104, a device drivers and services layer 106, an operating system ("OS") kernel layer 108, and a hardware layer 110.

The application layer 104 may include a number of applications that may be run on the device. For example, a user may access applications 112 and 114 on the device 102. The applications may include, but are not limited to, an email application, a video playback application, a music player application, etc.

The device drivers and services layer 106 allows access to hardware and service components by the application layer 104. In one embodiment, one such service may be the delegation manager software ("DLGM") 116, The delegation manager software 116 may receive user interface-related task delegation requests from the application layer 104. The DLGM 116 may be configured to initiate a point-to-point session between the delegating device and the delegated device. The DLGM 116 includes a delegation server 118 and a delegation client 120. When the device 102 is the delegating device in a session, the DLGM 116 may be configured to create a delegation client 120. When the device 102 is the delegated device in a session, the DLGM 116 may be configured to create a delegation server 118. As discussed in greater detail below, the delegation client 120 of the delegating device communicates with the delegation server 118 of the delegated device.

In a further embodiment, the device 102 may serve as a delegating device and a delegated device at different times or at the same time. Thus, the DLGM 116 may create a multiple number of delegation clients 120 and a multiple number of delegation servers 118. For example, a device 102 may delegate a user interface-related task associated with application 112 to a first delegated device and a user interface-related task associated with application 114 to a second delegated device. Thus, the device 102 may create two delegation clients 120, such that one is connected to the delegation server 118 of the first delegated device (e.g., the device that is delegated the user interface-related task associated with application 112) and the second delegation client is connected to the delegation server 118 of the second delegated device (e.g., the device that is delegated the user interface-related task associated with application 114). Additionally, the device 102 may also be delegated a user interface-related task from a second delegating device. Therefore, the device 102 may also create a delegation server 118 to receive requests from the second delegating device.

The OS kernel layer 108 may serve as an abstraction layer allowing access to hardware components. In one embodiment, the OS kernel layer 108 may be configured to allow the application layer 104 and the device drivers and services layer 106 to run on device 102 with different components without the need to be re-coded. Thus, an application may be programmed once to run on an operating system and deployed on multiple devices 102 that run the same OS kernel 108 but have different hardware components.

The hardware layer 110 may include the hardware components of the device 102. These components may include network communication devices, output and input devices such as, but not limited to, monitors, keyboards, touch screens, etc. In one embodiment, the application layer 104 and the device drivers and services layer 106 may access hardware components by interacting with the OS kernel layer 108. Thus, for example, the DLGM 116 may establish a connection with the DLGM of a second device over a network communications device that is part of the hardware layer 110 of the device 102.

Figure 2:
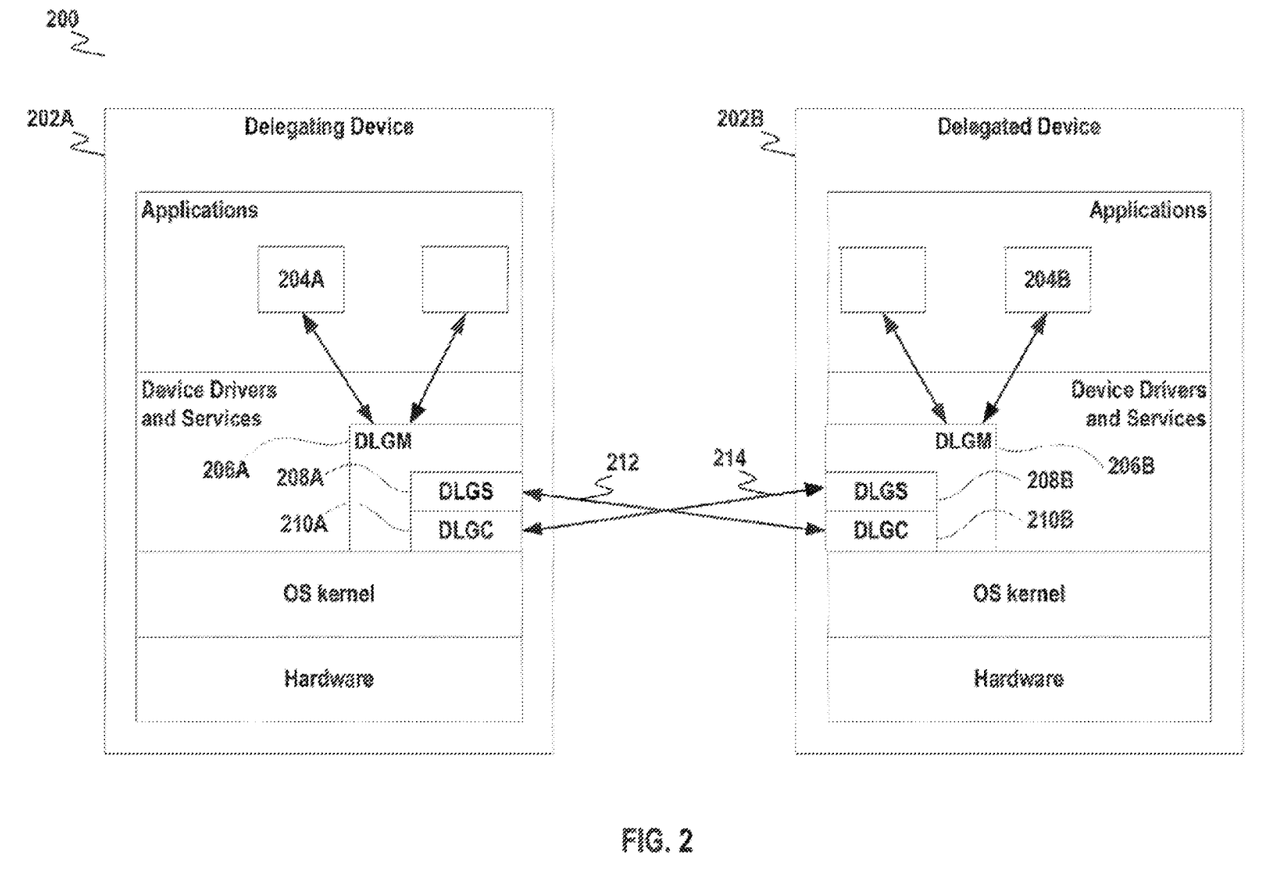
FIG. 2 depicts a system where user interface-related task delegation may be implemented in accordance with an illustrative embodiment.

FIG. 2 depicts a system 200 where user interface-related task delegation may be implemented in accordance with an illustrative embodiment. Delegating device 202A and delegated device 202B may include a delegation manager 206A and a delegation manager 206B, respectively. In one embodiment, an application 204A may request that a user interface-related task be delegated to another device. A delegated device 202B may be selected in one of several ways, including, but not limited to, searching for the delegated device 202B on a web-based delegation connection server, searching previously selected devices, and broadcasting a request over a personal area network. For example, the application 204A may search a web-based delegation connection server for a device to delegate the user interface-related task. If the delegating device 202A and the delegated device 202B have not been previously paired, the devices may authenticate each other, as described below. In another embodiment, the devices 202A and 202B may be required to pair each time a delegation request is initiated. One skilled in the art will understand that a number of security and authentication frameworks may be employed when pairing the devices. The user interface-related task delegation request and the delegated device 202B selection may be sent to the DLGM 206A.

The DLGM 206A may receive a request from an application 204A to delegate the user interface-related task to a delegated device 202B. In one embodiment, the DLGM 206A may send a delegation command to the DLGM 2063 of the delegated device 202B. The delegated device 202B may create a delegation server 2083 and send an acknowledgment to the delegating device 202A. The DLGM 206A may create a delegation client 210A and initiate a session with the delegation server 208B of delegation manager 206B of delegated device 202B. Once the session between the devices has been created, the user interface-related task may be sent to the delegated device 202B over the session. The session may be closed by either device.

Each device may be setup as a delegating device, a delegated device, or both. In one embodiment, the system may be symmetric in that both the delegating device 202A and the delegated device 202B may be capable of acting as both a delegating and a delegated device. Optionally, one or both of the delegating device 202A and the delegated device 202B may be both a delegating device and a delegated device simultaneously. Continuing the example above, the delegated device 202B may send a user interface-related task delegation request to delegating device 202A. Because the devices are already paired, delegating device 202A may start a delegation server 208A and the delegated device 202B may start a delegation client 210B. Thus, devices 202A and 202B may send and receive user interface-related task delegation requests 212, 214 at the same time.

Establishing a Delegated User Interface

Figure 3:
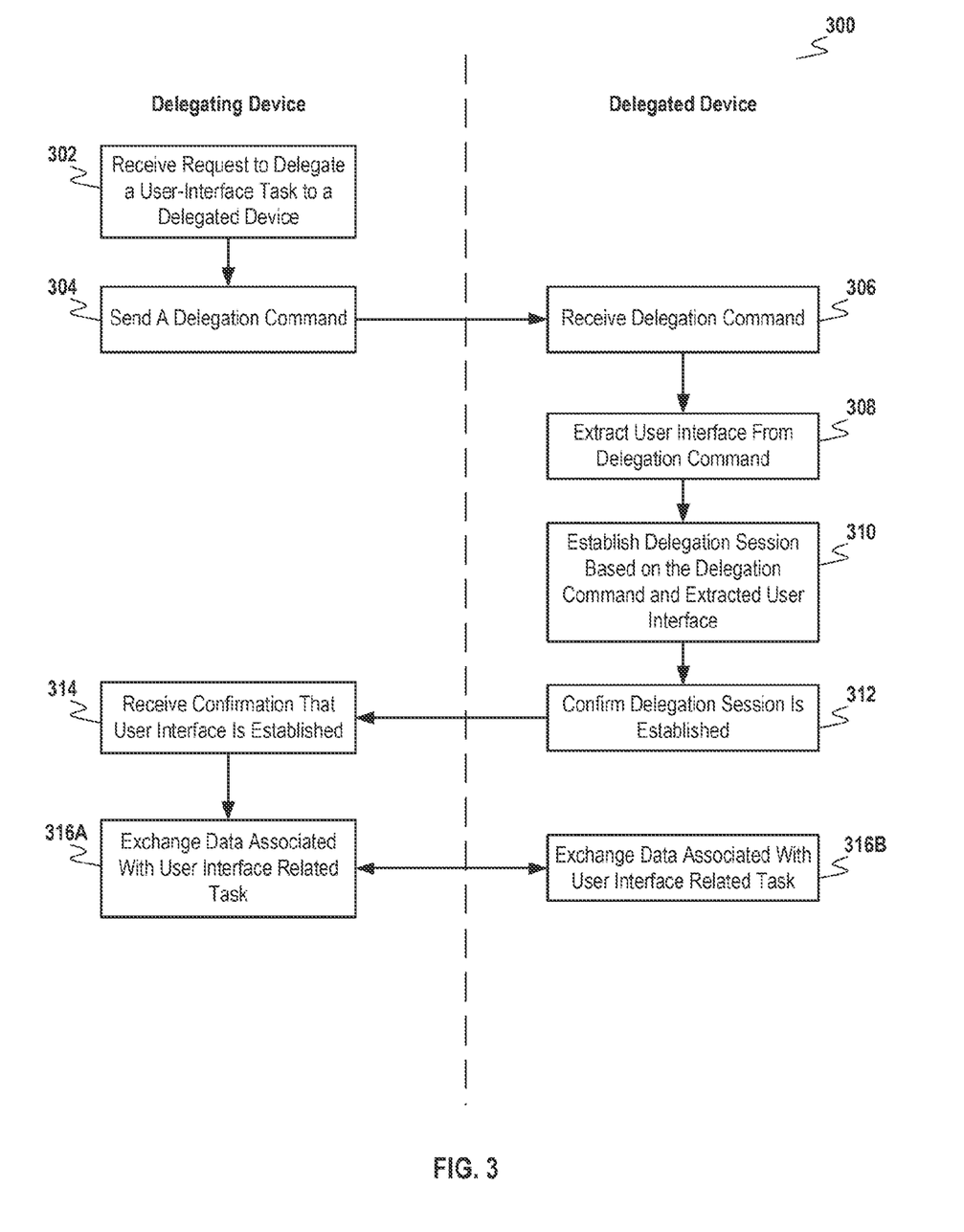
FIG. 3 depicts a flow diagram of a process for delegating a user interface-related task to a delegated device in accordance with an illustrative embodiment.

FIG. 3 depicts a flow diagram of a process for delegating a user interface-related task to a delegated device in accordance with an illustrative embodiment. Additional, fewer, or different operations may be performed, depending on the embodiment. A method 300 may be implemented on a computing device. In one embodiment, the method 300 is encoded on a computer readable medium that contains instructions that, when executed by a computing device, cause the computing device to perform operations of the method 300.

In one embodiment of the method 300, as described below, the delegating device receives a user interface-related task delegation request from an application 204A on a delegating device 202A. The delegating device sends a delegation command to the delegated device 202B. The delegated device 202B receives the delegation command, extracts user interface-related task information from the delegation command, and establishes the delegation session based on the delegation command and the extracted user interface-related task information. The delegated device sends a confirmation to the delegating device. Once the connection is set up, the delegating device and the delegated device may exchange data related to the user interface-related task using the connection established between the respective DLGMs on each device.

In an operation 302, the delegation manager 206A of the delegating device 202A receives a request to delegate a user interface-related task to a delegated device 202B. In one embodiment, a user may select a user interface component to indicate that an application 204A on the delegating device 202A may send a request to the DLGM 206A. For example, the application may present a user interface element to a user via a graphical display. The user interface element may include, but is not limited to, a button, a link, a key combination, or a gesture (e.g., swiping diagonally on a touch screen or right-clicking on an icon on a desktop), etc. If the user triggers the user interface element by, for example, clicking on a button, pressing the key combination, or gesturing in a pre-defined manner, the application may cause a list of devices to be displayed that may act as delegated devices. The user may select a device by, for example, clicking on an item in the list, where the item represents a device that may act as a delegated device. Upon receiving the selection by the user, the application 204A may send a request to the DLGM 206A to create a user interface-related task delegation command with an indication of the device selected to act as the delegated device 202B. The indication of the device may include, but is not limited to, an IP address, a MAC address, a unique identifier, etc.

In one embodiment, the delegating device may delegate multiple user interface-related tasks at the same time. For example, multiple user interface-related tasks may be delegated to a single device, such as a personal computer. In another embodiment, a user interface-related ask may be delegated to multiple delegated devices at the same time. For example, display/viewing of streamed audio and/or video may be delegated to multiple display devices at the same time.

In another embodiment, the application may allow the user to select a specific delegated device 202B using a mouse to click on an object including, but not limited to, a text document, an image, an audio file, etc. A contextual menu may be displayed in response to the click. In one embodiment, the contextual menu may list devices that may act as delegated devices for the selected object. The user may select a delegated device by clicking on an option in the contextual menu. In response to the user selection, the selection and the object may be sent to the DLGM 206A.

In yet another example, the application may allow the user to select a specific delegated device 202B by swiping in a particular direction. For example, if a user is viewing a video, the user may swipe to the right over the video. The application may determine based on, for example, the direction of the swipe, that the user wishes to delegate the video to a television that has been previously paired with the delegating device 202A. If, however, the user swipes to the left over the video, the application may send a request to the DLGM 206A to delegate the video to a desktop computer that has been previously paired with the delegating device. The application may indicate the available devices by, for example, displaying an icon for the available delegated devices. The icons may be laid out so that a user may swipe towards the icon to indicate a selection of the delegated device represented by the icon.

In a further embodiment, the selection of delegated devices may be limited based on the type of delegation or the permissions granted to an application or user. Accordingly, only a subset of all otherwise available delegated devices may be presented to the user for selection based on the type of delegation or the permissions granted to the application or user. For example, if a user is viewing a video on a mobile device, the application may have permission to delegate the video to a television screen. However, the application may be prevented from sending the same video to a desktop computer, based on, for example, security permissions associated with the video content.

The DLGM 206A may receive the request from the application and determine if the delegating device 202A and the selected delegated device 202B are already paired. For example, the DLGM 206A may maintain a list of devices with which the delegating device 202A has been authenticated and paired (i.e., devices that the delegating device 202A has a previously established relationship). If the DLGM 206A determines that the devices are not paired by, for example, not finding the delegated device in a relationship table, the delegating device 202A and the delegated device 202B may be paired and authenticated in the manner described below. Once the delegating device 202A and the delegated device 202B have established a relationship by authenticating and pairing with each other, the DLGM 206A may send a delegation command to the DLGM 206B on delegated device 202B.

In an operation 304, the DLGM 206A sends a delegation command to the DLGM 206B. In one embodiment, the DLGM 206A may create a delegation command based on the delegation request received in operation 302. For example, the delegation command may include information related to the user interface-related task to be delegated, such as, but not limited to an application identifier, the type of user interface-related task requested to be delegated, data associated with the delegation request, etc. The delegation command may be sent using network communication components such as wired or wireless transceivers.

In an operation 306, the delegated device 202B receives the delegation command. In one embodiment, the DLGM 206B may determine that the delegation command has been received from a delegating device 202A with which the delegated device 202B has a relationship with. If a relationship exists, the DLGM 206B may establish a delegation session. If, however, no relationship exists, the DLGM 206B can, for example, reject the delegation command or initiate a pairing and authentication request, as described below.

In an operation 308, the DLGM 206B extracts user interface-related task information from the delegation command. In one embodiment, the user interface-related task information may include information such as, but not limited to, the type of delegation task (e.g., open an independent application, display content on the delegated device, edit content, receive user input, or receive user input, etc.), configuration settings for the user interface-related task or for a user interface associated with the user interface-related task (e.g., a customized toolbar or other options/settings), etc. In another embodiment, the user interface-related task information may include an XML file with layout information for a user interface associated with the user interface-related task. The delegated device 202B may determine whether it is able to fulfill the delegation command. For example, if the user interface-related task to be delegated requires that a keyboard be connected to the delegated device 202B, the request may be rejected by the delegated device 202B if no keyboard is connected. If the delegated device 202B may perform the user interface-related task, then the DLGM 206B may initiate a delegation session. The delegating device 202A may transfer data to the delegated device 202B associated with the user interface-related task. The transferred data may include, but is not limited to, data to re-create a user interface associated with the user interface-related task on the delegated device 202B and content for display on the delegated device 202B.

In an operation 310, the DLGM 206B establishes a delegation session based on the delegation command and the extracted user interface-related task information. In one embodiment, the DLGM 206B may create an instance of the delegation server 208B. Once the delegation server 208B has been created, the DLGM 206B may send an acknowledgement to the DLGM 206A on the delegating device 202A. The delegation server 208B may receive requests from the delegating device 202A that sent the delegation command to the DLGM 206B. Thus, if more than one application delegates a user interface-related task to the delegated device 202B, then multiple respective delegation servers 208B may be created to handle respective requests 214 related to each delegation session.

In another embodiment, the DLGM 206B may contain a single instance of a delegation server 208B that may handle requests 214 from multiple delegation sessions. For example, the delegation server 208B may receive a request from a delegation client 210A. The delegation server 208B may determine if the DLGM 206B accepted a delegation command from the DLGM 206A that created the delegation client 210A. If the delegation command was accepted, then the delegation server 208B may perform tasks associated with requests sent by the delegation client 210A. If, however, the request was received from a delegation client associated with a refused delegation command or a delegation command that has been closed or canceled, then the request may be ignored or the delegation client may be informed that the request failed.

In an operation 312, the DLGM 206B sends a confirmation to the DLGM 206A indicating that the delegation session has been established. In one embodiment, the DLGM 206B may determine that the delegated device 202B may handle the delegated user interface-related task. Additionally, the DLGM 206B may indicate that the delegated device 202B is ready to receive requests 214 associated with the delegated user interface-related task. The confirmation may also include configuration information such as, but not limited to, the address of the delegation server 208B, commands available on the delegation server, the version of the delegation server 208B, etc.

In an operation 314, the DLGM 206A receives the confirmation from the DLGM 206B. In one embodiment, the DLGM 206A may create an instance of a delegation client 210A based on the confirmation received from the DLGM 206B. For example, the delegation client 210A may be created and configured to send all requests 214 to a particular address or to more than one address. Additionally, the delegation client 210A may be created and configured to send requests 214 in a particular format, based on, for example, the version of the delegation server 208B or the available commands on the server 208B. The created delegation client 210A may send and receive data associated with the delegated user interface to the delegation server 208B on the delegated device 202B. Each delegated user interface-related task may have a delegation client 210A associated with it. Thus, each delegation client 210A may be responsible for only one delegated user interface-related task.

In another embodiment, a single delegation client 210A may be created by the DLGM 206A. Data associated with each delegated user interface-related task may be handled by a single delegation client 210A. Thus, the delegation client 210A may determine which delegation server 208B to send a request 214 to based on, for example, the application with which the request 214 is associated. Once the delegation client 210A at the delegating device 202A and the delegation server 208B on the delegated device 202B are created, all subsequent transfer of data associated with the user interface-related task may be between the delegation client 210A and the delegation server 208B.

In operations 316A and 316B, data associated with the delegated user interface-related task is exchanged between the delegation client 210A and the delegation server 208B. In one embodiment, the data associated with the delegated user interface-related task may include, but is not limited to, commands to open an application, data to be viewed, user interface elements, user inputs, etc. Additionally, data associated with content may be sent to the delegating server 208B and received by the delegating client 210A. Thus, content may be sent to a delegated device, the delegated device may modify the content, and the modified content may be sent back to the delegating device 202A for storage or further processing. Data received by the delegation server 208B may be sent to an application on the delegated device 202B and data received by the delegating client 210A may be sent to an application on the delegating device 202A. The type of data exchanged may depend on the type of user interface-related task that has been delegated to the delegated device 202B. Example types of delegated user interface-related tasks are described in additional detail below.

Operation of the user interface-related task during the delegation session depends on the type of user interface-related task that is delegated. For example, in one embodiment, for a user interface-related task that involves editing a document or object, the original document or object is transferred to the delegated device at the beginning of the delegation session, edited at the delegated device, and the edited document or object is returned to the delegating device at the end of the delegation session. In another embodiment, where a user interface is also delegated, key codes associated with user interface inputs received at the user interface on the delegated device are transferred in real-time back to the delegating device which may effectuate the inputs. For example, if a user interface on the delegated device receives a command to add a character to a word document, this command is transferred to the delegating device which performs the addition.

Once established, the session between the delegation client 210A and the delegation server 208B may be later closed by either the delegating device 202A or the delegated device 202B. In one embodiment, a user interface associated with the user interface-related task on the application 204A (either at the delegating device 202A or the delegated device 202B) may include a user interface element which, when triggered, may send a command to the DLGM 206A, which may close the session. For example, the user interface may include an element such as, but not limited to, a button, a link, a key combination, a gesture, etc. The user can, for example, trigger the user interface element by clicking on a button or carrying out the pre-defined gesture. In one embodiment, the DLGM 206A, upon receiving the close command, may send a request to the DLGM 206B to close the session. The DLGM 206B may close the delegation server 208B and send an acknowledgement to the DLGM 206A. Upon receipt of the acknowledgement, DLGM 206A may close the delegation client 210A. In another example, the DLGM 206B may initiate the close session request by sending a request to the DLGM 206A. The DLGM 206A may close the delegation client 210A and respond with an acknowledgement. In one embodiment, updated documents and/or objects may also be communicated between the DLGM 206A and the DLGM 206B. The DLGM 206B may receive the acknowledgement and close the delegation server 208B.

Figure 4:
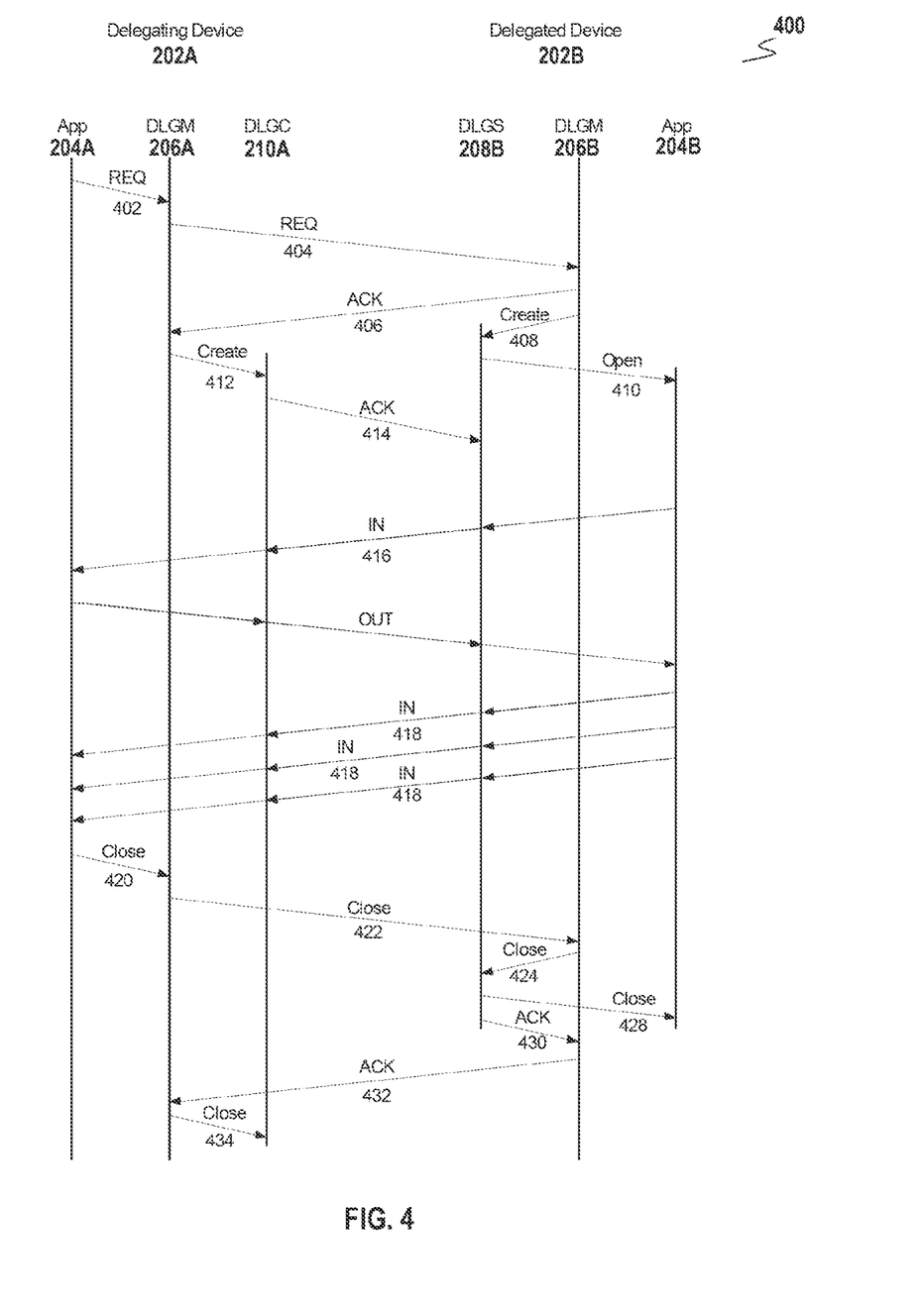
FIG. 4 depicts a flow diagram of a process for establishing and closing a session between a delegated device and a delegating device in accordance with an illustrative embodiment.

FIG. 4 depicts a flow diagram of a process for establishing and closing a session between the delegated device 202A and the delegating device 202B in accordance with an illustrative embodiment. Additional, fewer, or different operations may be performed, depending on the embodiment. A method 400 may be implemented on a computing device. In one embodiment, the method 400 is encoded on a computer readable medium that contains instructions that, when executed by a computing device, cause the computing device to perform operations of the method 400.

In one embodiment of the method 400, as described below, the application 204A operating on the delegating device 202A sends a delegation request 402 to the DLGM 206A requesting delegation of a user interface-related task. The DLGM 206A transfers the request 404 to the DLGM 206B of the delegated device 202B. The DLGM 206B of the delegated device 202B sends an acknowledgement 406 to the DLGM 206A of the delegating device 202A. The DLGM 206B creates 408 a delegation server 208B. The delegation server 208B opens an application 410 to perform the delegated user interface-related task. The delegating DLGM 206A creates 412 a delegation client 210A. The delegation client 210A sends an acknowledgement 414 to the delegation server 208A acknowledging establishment of a delegation session for the user interface-related task.

During the delegation session, delegated session data is transferred 416, 418 between the application 204A and the application 204B via communication between the delegation client 210A and the delegation server 208B. For example, data output from a delegated application 204B is sent to the delegation server 208B, the delegation server 208B sends the output to the delegation client 210A, and the delegation client 210A sends the output to the delegating application 204A. The delegation session thereby allows the delegated user interface related-task to be performed on the delegated device 202B.

Upon receiving an instruction to close the delegation session, the delegating application 204A sends a close command 420 to the DLGM 206A. The DLGM 206A sends a close command 422 to the DLGM 206B. The DLGM 206B sends a close command 424 to the delegation server 208B. The delegation server 208B sends a close command 428 to the delegated application 204B. The delegation server 208B sends an acknowledgement 430 to the DLGM 206B and closes. The DLGM 206B sends an acknowledgement 432 to the DLGM 206A. The DLGM 206A sends a close command 434 to the delegation client 210A.

Types of User Interface-Related Tasks for Delegation

The user interface-related task delegation method, discussed above, establishes a connection between a delegation client 210A on the delegating device 202A and a delegation server 208B on the delegated device 202B. The established connection is used to exchange data associated with the delegated task. Based on the delegated task, different data may be sent. Furthermore, the life of the connection may be based on the type of the delegated user interface-related task. The type of delegated user interface-related task may include, but is not limited to, an asynchronous open task, a show task, an edit task, a get keyboard task, a get pointer task, a get user interface task, etc. Each of these tasks is detailed below.

The asynchronous task may be used to open an independent asynchronous application on the delegated device 202B to handle an object received from the delegating device 202A. In one embodiment, the object may be, but is not limited to, a uniform resource locator (URL), a document, an image, etc. The delegation client 210A may send a request 214 to the delegation server 208B, the request including the object to be opened on the delegated device 202B. The delegation server 208B may receive the request 214 and open an independent asynchronous application to handle the object on the delegated device 202B. For example, the delegation client 210A may send a URL to the delegation server 208B. Upon receipt of the URL, the delegation server 208B may open an application 204B on the delegated device 202B and send the object to the opened application 204B. For example, the application 204B may be a web browser. Upon receiving the URL from the delegation server 208B, the browser may retrieve the contents of the URL and display the contents on the delegated device 202B. The asynchronous task may close the established connection after receiving the initial request. In another example, the delegation server 208B may send information to the delegation client 210B related to the asynchronous task such as, but not limited to, the application process identifier, a browser window identifier, etc, before closing the established session.

The show task may be used to display content from the delegating device 202A on the delegated device 202B. In one embodiment, a user of the application 204A may select an object, such as, but not limited to, a picture, a document, an audio file, etc., on the delegating device 202A. For example, a picture may be selected and sent to the delegation client 210A, which sends the picture to the delegation server 208B. The delegation server 208B may open a view of the object on the delegated device 202B. The delegation client 210A may send a new picture and the delegation server 208B may display the new object in the view that was opened to display the first picture. The show task keeps the established connection alive until the view is closed.

The edit task may be used to open received content for editing on the delegated device 202B. In one embodiment, a user of the application 204A may select an object, such as, but not limited to, a picture, a document, an audio file, etc., on the delegating device 202A. For example, a document may be selected and sent to the delegation client 210A, which sends the document to the delegation server 208B. The delegation server 208B may open an application that may be used to edit the document on the delegated device 202B. The edited document may be sent back to the delegating device 202A for storage. For example, each time a user indicates that the document should be saved, the updated document may be automatically sent (without the need for a specific command from the user to perform such a transmission) back to the delegating device 202A over the established connection and the delegating device 202A may update the local copy of the document. When the document is closed, the delegation server 208B may send the document to the delegation client 210A. The edit task keeps the established connection alive until the document that is being edited is closed.

The get keyboard task may be used to enter content using input devices at the delegated device 202B. In one embodiment, a user may select an object to be edited on the delegating device 202A. The object may include, but is not limited to, a text-field, a word document, a picture, etc. For example, a user may select a text field to enter content. The user may select a user interface element, indicating that the input devices at the delegated device 202B should be used. An identifier for the selected object may be sent to the delegation client 210A, which sends the identifier to the delegation server 208B. The delegation server 208B may begin listening for inputs of the type selected by the application 204A. For example, the application may select an input type of a keyboard. The delegation server 208B may send each input at the delegated device 202B to the delegation client 210A. The delegation client 210A may send the received input to the application 204A to update the selected object. The established connection may remain open until the user indicates that no more input is needed. In another example, the connection may be terminated when the input field is no longer editable.

The get pointer task may be used to receive a pointer input from the delegated device 202B. The delegated device 202B may include a pointer device such as, but not limited to, a touch pad, a mouse, directional keys, etc. In one embodiment, a user may select a user interface element, indicating that the pointer devices at the delegated device 202B should be used. The delegation server 208B may begin listening for inputs of the type selected by the application 204A. For example, the application may select an input type of a touchpad. The delegation server 208B may send each touchpad input at the delegated device 202B to the delegation client 210A. The delegation client 210A may send the received input to the application 204A to update the location of the pointer in the application 204A. The established connection may remain open until the user indicates that no more input is needed.

The get user interface task may be used to display portions of a user interface associated with the application 204A on the delegated device 202B. The application 204A may send a definition file to the delegation client 210A. The delegation client 210A may send a request with the definition file to the delegation server 208B. The delegation server 208B may open the application 204B to display a user interface based on the received definition file. A user may interact with the user interface displayed on the delegated device 202B using the delegated device 202B. Each time the user interacts with the displayed user interface, the delegation server 208B may send the input to the delegation client 210A. The delegation client 210A may send the received input to the application 204A. The established connection between the delegation client 210A and the delegation server 208B may remain open until the application 204B is closed or until the delegated user interface is closed.

Pairing and Authentication of Devices

The delegation of user interface-related tasks occurs between paired devices. In one embodiment, in order for devices to be paired, the delegated device 202B should be authenticated and trusted by the user of the delegating device 202A. The delegated device 202B may be authenticated at various times. For example, the delegated device may be authenticated by adding the delegated device 202B to the list of paired devices. The delegated device 202B may also be authenticated the first time a delegation request is made or every time a delegation request is made. In one embodiment, the delegating device 202A may send a request for a passphrase to the delegated device 202B. A passphrase may be entered on the delegated device 202B and sent to the delegating device 202A. The delegating device 202A may validate the passphrase and, if the passphrase is valid, the two devices may establish a connection to send and receive user interface tasks. Additional authentication mechanisms may also be used as known to those of skill in the art. For example, a public key/private key pair may be used to authenticate the devices or a central server may be used to verify the identity of the other device. In addition, a Bluetooth pairing mechanism may also be used. It will be understood by one skilled in the art that multiple authentication and pairing mechanisms may be employed to establish trust between the delegating device 202A and the delegated device 202B.

Figure 5:
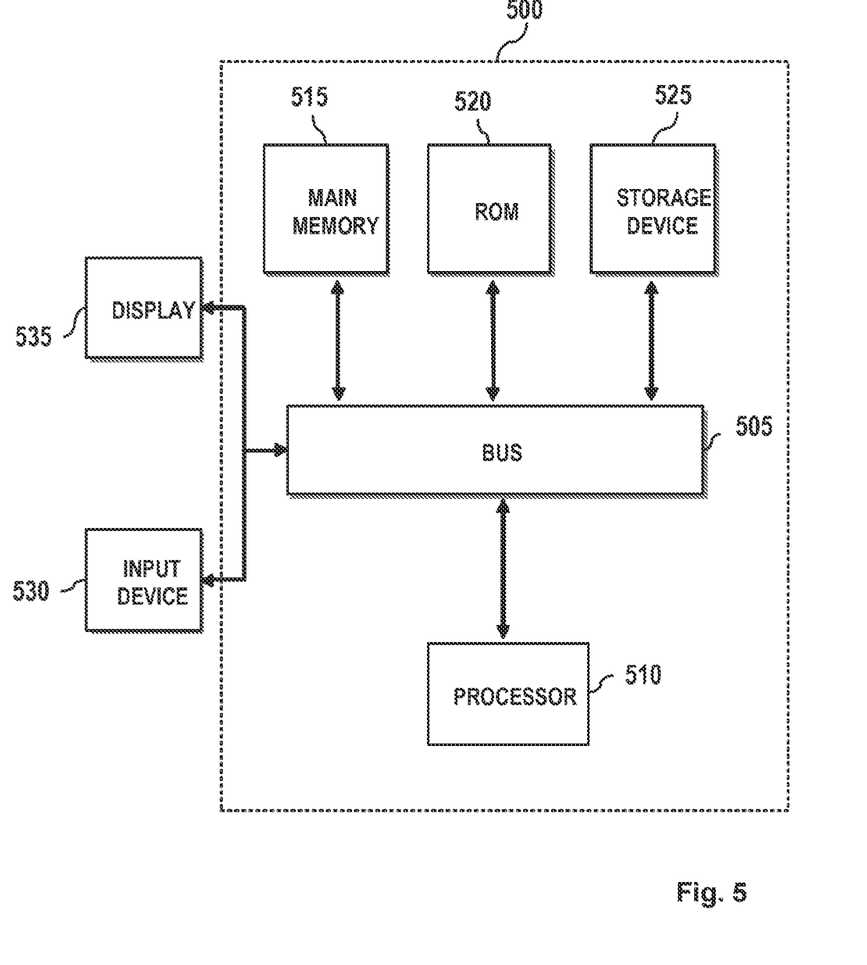
FIG. 5 depicts a block diagram of a computer system, which may be used to delegate a user interface-related task in accordance with an illustrative embodiment.

FIG. 5 is a block diagram of a computer system, which may be used to delegate a user interface-related task, in accordance with an illustrative implementation. The computer system or computing device 500 may be used to implement the device 102, the delegating device 202A, and the delegated device 202B. The computing system 500 includes a bus 505 or other communication component for communicating information and a processor 510 or processing circuit coupled to the bus 505 for processing information. The computing system 500 may also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 may also be used for storing position information, temporary variables, or other intermediate information during execution of instructions by the processor 510. The computing system 500 may further include a read-only memory (ROM) 520 or other static storage device coupled to the bus 505 and configured to store static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 and configured to communicate information and command selections to the processor 510. In another implementation, the input device 530 has a touch screen display 535. The input device 530 may include a cursor control, such as a mouse, a trackball, or cursor direction keys, for communicating direction information and command selections to the processor 510 and for controlling cursor movement on the display 535.

According to various implementations, the processes described herein may be implemented by the computing system 500 in response to the processor 510 executing an arrangement of instructions contained in main memory 515. Such instructions may be read into main memory 515 from another computer-readable medium, such as the storage device 525. Execution of the arrangement of instructions contained in main memory 515 causes the computing system 500 to perform the illustrative processes described herein. One or more processors in a mufti-processing arrangement may also be employed to execute the instructions contained in main memory 515. In alternative implementations, hardwired circuitry may be used in place of or in combination with software instructions to effect illustrative implementations. Thus, implementations are not limited to any specific combination of hardware circuitry and software.

Although an example computing system has been described in FIG. 5, implementations described in this specification may be implemented in other types of digital electronic circuitry, or in computer software, firmware, or hardware, including the structures disclosed in this specification and their structural equivalents, or in combinations of one or more of them.

User Interface-Related Task Delegation Examples

An example scenario of delegating a user interface-related task is as follows: A user receives an email on her smartphone. She opens a mail application on the smartphone and reads the email. She sees that there is a document attached to the email. Because the user is near her desktop computer, she delegates editing the document to her desktop computer. The document is opened using a compatible application on the desktop computer, where the user may read, edit, and save the document. The user may then determine that she wants to respond to the email. She may click on a button on her smartphone, thereby delegating the reply screen to her desktop. In this way, she may compose an email, attach the edited document, and send the email via a user interface on the desktop.

A second example scenario of delegating a user interface-related task is as follows: A user receives a text message on her smartphone. The text message contains a link to a web page. The user taps the link to the web page. The web page opens on the smartphone browser. Because the web page is not easy to read, the user clicks on a button to send the link to a delegated device, such as her tablet. The user then accesses her tablet and sees that the web page indicated by the URL is displayed in a web browser on the tablet. The user decides that she wants to respond to the text message. She returns to her smartphone and swipes on the text field to delegate the tablet to act as a keyboard for entry of content into the text field. The tablet opens a comfortable touch keyboard all over the screen and the user may type the reply. The message may be viewed on the smartphone screen while the user is typing. When the user is finished, she may press send on the tablet, the smartphone sends the message, and the keyboard on the tablet is closed.

A third example scenario of delegating a user interface-related task is as follows: A user is working on her desktop when she comes across a video clip on a website. She wants to show the video clip to her family members, so she right clicks on an icon for the video clip and is prompted by the desktop to select one or a plurality of possible delegation devices. The user selects a previously-paired television which prompts the delegation of playback of the video clip to her television in the living room and calls her kids to see the video on the television. The video clip is quite long, so one of her children decides to delegate the open video clip to his music player, which may also play videos, and watch the remaining portion of the video on the music player. In the meantime, the television may continue to play the video as well.

Implementations described in this specification may be implemented in digital electronic circuitry, or in computer software, firmware, or hardware, including the structures disclosed in this specification and their structural equivalents, or in combinations of one or more of them. The implementations described in this specification may be implemented as one or more computer programs, i.e., one or more modules of computer program instructions, encoded on one or more computer storage media for execution by, or to control the operation of, data processing apparatus. Alternatively or in addition, the program instructions may be encoded on an artificially generated propagated signal, e.g., a machine-generated electrical, optical, or electromagnetic signal that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus may include special purpose logic circuitry, e.g., an FPGA (field programmable gate array) or an ASIC (application specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations may also be implemented in combination in a single implementation. Conversely, various features described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated in a single software product or packaged into multiple software products.

Thus, particular implementations of the invention have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A delegation method, comprising:
   receiving, at a delegating computing device, a request to delegate a task involving user interaction to a delegated computing device;
   sending a delegation command from the delegating computing device to the delegated computing device to establish a delegation session, on the delegated computing device, wherein the delegation command requests establishment of the task involving user interaction on the delegated computing device;

receiving, at the delegating computing device, a confirmation of the established delegation session on the delegated computing device, wherein the delegation session is established based on the delegation command and on information associated with the task involving user interaction extracted from the delegation command;

creating, at the delegating computing device, a delegation client to facilitate control of communication with the delegated computing device for the delegation session, wherein the delegation client processes data for a delegating application on the delegating computing device;

acknowledging, at the delegating computing device, creation of a delegation server on the delegated computing device;

presenting a first user interface at the delegating computing device to facilitate the user interface related task;

exchanging data associated with the task involving user interaction between the delegation client and the delegation server, wherein the data that is exchanged is sufficient to re-create a user interface as the first user interface on the delegated computing device to facilitate performance of the user interface related task;

receiving, at a first delegation manager on the delegating computing device, a termination command from the delegated computing device to end the delegation session; and forwarding the termination command to end the delegation session from the first delegation manager to the delegating application on the delegating computing device.

2. The delegating method of claim 1, wherein exchanging the data comprises:

sending a command from the delegating application to a first delegation manager on the delegating computing device, to end the delegation session; and forwarding the command to end the delegation session from the first delegation manager to a second delegation manager on the delegated computer device.

3. The delegation method of claim 2, further comprising:

receiving an acknowledgement that the delegation server on the delegated computing device has been closed; and in response to receiving the acknowledgement that the delegation server has been closed, closing the delegating client at the delegating computing device.

4. The delegation method of claim 1, further comprising presenting, on a second user interface, a list of paired devices eligible for task delegation.

5. The delegation method of claim 4, wherein the request to delegate the task involving user interaction to the delegated computing device comprises a selection of a paired device from the list of paired devices.

6. The delegation method of claim 1, further comprising automatically recognizing, at the delegating computing device, actions associated with the task involving user interaction performed at the delegated computing device.

7. The delegating method of claim 1, wherein exchanging the data comprises:

receiving the data from the delegating application at the delegation client; and transferring the data from the delegation client to the delegation server on the delegated computing device.

8. The delegation method of claim 1, wherein receiving the request to delegate the task involving user interaction comprises receiving a specified input from a user.

9. A delegating device, comprising:

a user interface;

a transceiver configured to send and receive data;

a memory configured to store computer-executable instructions; and a processor coupled to the user interface, the transceiver, and the memory, wherein the processor is configured to execute the computer-executable instructions to:

identify a request to delegate a user interface related task to a delegated computing device, the delegated computing device selected by one of: a search on a web-based delegation connection server, a search of previously delegated computing devices, and a broadcast of a request over a personal area network;

cause the transceiver to send a delegation command to the delegated computing device to establish a delegation session on the delegated computing device, wherein the delegation command requests establishment of a delegated user interface to facilitate performance of the user interface related task at the delegated computing device;

create a delegation client to facilitate control of communication with the delegated computing device for the delegation session, wherein the delegation client processes data for a delegating application on the delegating device;

acknowledge creation of a delegation server on the delegated computing device;

present a first user interface at the delegating device to facilitate the user interface related task;

exchange data associated with the user interface related task between the delegation client and the delegation server, wherein the data that is exchanged is sufficient to re-create an interface as the first user interface on the delegated computing device to facilitate the performance of the user interface related task; and in response to a termination command to end the delegation session, forward the termination command to the delegated computing device and close the delegation client.

10. The delegating device of claim 9, wherein the exchange of data enables the processor to automatically recognize actions associated with the user interface related task performed at the delegated computing device.

11. The delegating device of claim 9, wherein to exchange the data, the processor is configured to execute the computer-executable instructions to:

obtain the data from the delegating application at the delegation client; and transfer the data from the delegation client to the delegation server on the delegated computing device.

12. The delegating device of claim 9, wherein to exchange the data, the processor is configured to execute the computer-executable instructions to:

obtain the data from a delegated application at the delegation client; and transfer the data from the delegation client to the delegating application on the delegating device.

13. The delegating device of claim 9, wherein the delegating device and the delegated computing device are connected by the personal area network.

14. The delegating device of claim 9, wherein the detection delegating device and the delegated computing device are connected by a local area network.

15. The delegating device of claim 9, wherein communications between the delegating device and the delegated computing device are facilitated by the web-based delegation connection server.

16. The delegating device of claim 9, wherein the processor is further configured to execute the computer-executable instructions to identify an acknowledgement of the request from the delegated computing device.

17. A delegated device, comprising:
   a user interface;
   a transceiver configured to send and receive data;
   a memory configured to store computer-executable instructions; and
   a processor coupled to the user interface, the transceiver, and the memory, wherein the processor is configured to execute the computer-executable instructions to:
   identify a delegation command received from a delegating computing device to establish a delegation session, wherein the delegation command requests establishment of a user interface related task on the delegated device, and wherein the user interface related task was initiated at the delegating computing device;
   extract information associated with the user interface related task from the delegation command to determine whether the delegated device is able to perform the user interface related task;
   in response to a determination that the delegated device is able to perform the user interface related task, create a delegation server, send acknowledgement of creation of the delegation server to the delegating computing device, initiate the delegation session, present a first user interface to facilitate the user interface related task, and exchange data associated with the user interface related task between the delegation server and a delegation client of the delegating computing device for a specific time period based on a type of the user interface related task, wherein:
   the delegation server processes data from the delegation client of the delegating computing device; and
   the data that is exchanged is sufficient to re-create a user interface as the first user interface on the delegated device to facilitate performance of the user interface related task;
   in response to a termination command from the delegating computing device to end the delegation session, close the delegation server; and
   in response to a determination that the delegated device in unable to perform the user interface related task, reject the request to establish the delegation session.

18. The delegated device of claim 17, wherein the processor is further configured to execute the computer-executable instructions to send, to the delegating computer device, a summary of actions performed at the delegated device corresponding to the user interface related task to enable re-creation of the actions on the delegating computing device, after receipt of the termination command to end the delegation session.

* * * * *

UNITED STATES PATENT AND TRADEMARK OFFICE
CERTIFICATE OF CORRECTION

PATENT NO. : 9,699,243 B2  
APPLICATION NO. : 14/342377  
DATED : July 4, 2017  
INVENTOR(S) : Hirshberg Page 1 of 2

It is certified that error appears in the above-identified patent and that said Letters Patent is hereby corrected as shown below:

In the Specification

In Column 4, Line 7, delete "("RDA")," and insert -- ("IRDA"), --, therefor.

In Column 4, Line 64, delete "116, The" and insert -- 116. The --, therefor.

In Column 6, Line 12, delete "DLGM 2063" and insert -- DLGM 206B --, therefor.

In Column 6, Line 14, delete "server 2083" and insert -- server 208B --, therefor.

In Column 14, Line 46, delete "mufti-processing" and insert -- multi-processing --, therefor.

In Column 18, Line 37, delete "general such" and insert -- general, such --, therefor.

In the Claims

In Column 19, Line 38, in Claim 2, delete "command from" and insert -- command, from --, therefor.

In Column 19, Line 43, in Claim 2, delete "computer device." and insert -- computing device. --, therefor.

In Column 20, Lines 65-66, in Claim 14, delete "detection delegating device" and insert -- delegating device --, therefor.

In Column 22, Line 18, in Claim 17, delete "device in" and insert -- device is --, therefor.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,699,243 B2

In Column 22, Line 23, in Claim 18, delete "delegating computer device," and insert -- delegating computing device, --, therefor.

In Column 22, Line 27, in Claim 18, delete "device, after" and insert -- device after --, therefor.